(12) United States Patent
Blumenroether et al.

(10) Patent No.: US 8,792,518 B2
(45) Date of Patent: Jul. 29, 2014

(54) AUTOMATION SYSTEM

(75) Inventors: Alexander Blumenroether, Petershagen (DE); Jens Breitenstein, Hannover (DE)

(73) Assignee: Wago Verwaltungsgesellschaft mbH, Minden (DE)

( * ) Notice: Subject to any disclaimer, the term of this patent is extended or adjusted under 35 U.S.C. 154(b) by 134 days.

(21) Appl. No.: 13/439,137

(22) Filed: Apr. 4, 2012

(65) Prior Publication Data

US 2013/0003754 A1 Jan. 3, 2013

(30) Foreign Application Priority Data

Apr. 4, 2011 (DE) .......................... 10 2011 015 966

(51) Int. Cl.
*H04J 3/24* (2006.01)

(52) U.S. Cl.
USPC ........................................................ 370/473

(58) Field of Classification Search
None
See application file for complete search history.

(56) References Cited

U.S. PATENT DOCUMENTS

| | | | | |
|---|---|---|---|---|
| 6,021,124 | A | 2/2000 | Haartsen | |
| 6,912,210 | B1 * | 6/2005 | Uchiba et al. | 370/300 |
| 2002/0131425 | A1 * | 9/2002 | Shalom | 370/401 |
| 2002/0146036 | A1 * | 10/2002 | Berger | 370/468 |
| 2003/0039250 | A1 * | 2/2003 | Nichols et al. | 370/394 |
| 2003/0214930 | A1 * | 11/2003 | Fischer | 370/338 |
| 2004/0042440 | A1 * | 3/2004 | McGowan | 370/345 |
| 2004/0095929 | A1 * | 5/2004 | Aoshima | 370/389 |
| 2005/0018638 | A1 * | 1/2005 | Lindskog et al. | 370/338 |
| 2005/0111416 | A1 * | 5/2005 | Ginzburg | 370/338 |
| 2005/0238054 | A1 * | 10/2005 | Sharma | 370/473 |
| 2006/0035589 | A1 * | 2/2006 | Shvodian | 455/18 |
| 2007/0232288 | A1 | 10/2007 | McFarland et al. | |
| 2008/0181163 | A1 * | 7/2008 | Ye et al. | 370/312 |
| 2008/0232365 | A1 * | 9/2008 | Oostveen et al. | 370/389 |
| 2010/0166015 | A1 | 7/2010 | van Greunen et al. | |
| 2011/0069668 | A1 * | 3/2011 | Chion et al. | 370/329 |
| 2013/0148640 | A1 * | 6/2013 | Li et al. | 370/338 |

FOREIGN PATENT DOCUMENTS

| | | |
|---|---|---|
| DE | 698 25 882 T2 | 1/2005 |
| DE | 698 25 882 | 9/2005 |
| DE | 10 2006 055 513 | 11/2007 |
| DE | 10 2006 055 513 A1 | 11/2007 |
| DE | 10 2008 025 234 A1 | 3/2009 |
| DE | 10 2008 025 234 | 12/2009 |
| DE | 10 2009 013 229 A1 | 1/2010 |
| DE | 10 2009 013 229 | 9/2010 |
| EP | 1 675 311 | 6/2006 |
| EP | 1 675 311 A1 | 6/2006 |
| EP | 2 039 075 B1 | 1/2010 |
| WO | 01/48 958 A1 | 7/2001 |
| WO | WO 01/48958 | 7/2001 |

OTHER PUBLICATIONS

Stop-and-wait ARQ, Wikipedia, 2 pages, Mar. 2011.
Wikipedia: "Stop-and-wait ARQ", Mar. 2011, 2 pages.

* cited by examiner

*Primary Examiner* — Otis L Thompson, Jr.
(74) *Attorney, Agent, or Firm* — Renner, Otto, Boisselle & Sklar, LLP.

(57) ABSTRACT

The invention relates to a method for transmitting data in an automation system with cyclic data transmission, wherein data are divided into fragments and the fragments are transmitted together with a fragment information item to the opposite side. In this case, a fragment is transmitted until the opposite side sends back a corresponding confirmation in the fragment information item.

16 Claims, 4 Drawing Sheets

| Priority [0...255] | Priority [Transmitter] | Subpriority [Transmitter] | Priority [Receiver] |
|---|---|---|---|
| 0 | 0 | 0 | 0 |
| 1 | 1 | 0 | 1 |
| 2 | 1 | 1 | 1 |
| 3 | 1 | 2 | 1 |
| 4 | 1 | 3 | 1 |
| 5...255 | 1 | 4 | 1 |

Figure 4a

| Priority [0...255] | Priority [Transmitter] | Subpriority [Transmitter] | Priority [Receiver] |
|---|---|---|---|
| 0 | 0 | 0 | 0 |
| 1 | 0 | 1 | 0 |
| 2 | 1 | 0 | 1 |
| 3 | 1 | 1 | 1 |
| 4 | 2 | 0 | 2 |
| 5...255 | 2 | 1 | 2 |

Figure 4b

| Priority [0...255] | Priority [Transmitter] | Subpriority [Transmitter] | Priority [Receiver] |
|---|---|---|---|
| 0 | 0 | 0 | 0 |
| 1 | 0 | 1 | 0 |
| 2 | 0 | 2 | 0 |
| 3 | 0 | 3 | 0 |
| 4 | 0 | 4 | 0 |
| 5...255 | 1 | 0 | 1 |

Figure 4c

AUTOMATION SYSTEM

The invention relates to a method for transmitting data in an automation system comprising a first automation network component and at least one second automation network component, said automation network components being formed via an automation network for cyclic data transmission using a communication protocol on which the automation network is based for the purpose of data transport and being connected to one another.

The invention also relates to an automation system, a computer program and an automation network component therefor.

Owing to economic pressure, the degree of automation has increased markedly over broad sectors of the industrial landscape. In this case, an essential main feature of automation engineering is that machines and installations are controlled semi-automatically or fully automatically such that, for example in an industrial production process, this process is implemented safely and for the most part without the intervention of humans. In addition, there are numerous other possible uses, such as safe monitoring of workstations or the control and regulation of application processes running in buildings, such as elevator or light control, for example. Finally, the application area in the automotive sector should also not be forgotten, in which a wide variety of control devices and sensors are connected to one another nowadays via fieldbus systems designed specifically for this purpose.

Automation systems usually have a plurality of field devices, such as sensors or actuators, which are usually connected to a superordinate programmable controller, a fieldbus controller or other types of device for controlling, regulating, operating or monitoring via an I/O system. In this case, decentralized, modular I/O systems in which an I/O node comprises a fieldbus coupler or controller and a combination of different I/O modules can be used in a particularly flexible manner. The modular concept permits matching to the type and number of field devices present by suitable combination of different fieldbus-independent I/O modules and connection to the present fieldbus by combination thereof with a corresponding fieldbus coupler. In order to make this modular concept possible, but also for reasons of failsafety and the limited computation capacities of an embedded system, the communication between I/O modules and fieldbus couplers is of the form that the modules transmit cyclically an input process image to the coupler and said coupler transmits cyclically an output process image to the modules, wherein the internal structure, i.e. the arrangement and length of the process data, no longer changes after runup of the system. In this case, cyclically means that the data to be forwarded are transmitted continuously, in a similar manner to a ringbus structure, and at time-discrete intervals, in contrast to event-controlled data communication networks.

As regards the interconnection of decentralized automation components, various fieldbus systems have been established depending on the sector of industry. Possible examples for this are CAN bus, Profibus or Modbus. Each of these fieldbus systems uses corresponding communication protocols for the data interchange, said communication protocols being intended to ensure the physical data transport from one component to the next component. As regards many protocol properties, such as, for example, the maximum data size which can be transmitted per message with the aid of the communication protocol, or else the frequency of the data interchange, the respective fieldbus systems and implementations sometimes differ greatly from one another.

Often, therefore, measurement or control data to be interchanged with the field devices are also transported on the fieldbus by virtue of the fact that a configuration-specific process image is interchanged cyclically between the subscribers and the master(s) of the fieldbus system. The basic property of the cyclic processing is such that precisely one snapshot of the process image is present at any point in time in any data-processing station, i.e. in this case in the I/O module, the fieldbus coupler, the fieldbus master and the control program.

If cyclic data interchange with an adjacent station in the communication chain has taken place, this snapshot is overwritten by the respective next snapshot. If the cycle time in which data are received from the respective preceding station is greater than the cycle time in which data are passed on to the respective next station, the present snapshot is repeated until it has been replaced by the next snapshot. If, conversely, the cycle time for the preceding station is less than that for the next station, the process image is, under certain circumstances, overwritten a plurality of times before it is transmitted to this next station. For cyclic process data such as values of an analog sensor, this form of a communication protocol does not represent any problem.

A decisive factor for the system performance of an I/O system is, inter alia, the minimum cycle time which can be achieved in the I/O node. For this reason, the size of the process images used by I/O modules is strictly limited and is generally only rarely more than is necessary for directly imaging the process values of connected field devices. Since it is also traditionally a characteristic of the hardware, there are sometimes narrow limits for the maximum possible size of a process image depending on the I/O system.

There are not uncommon application cases in which workers or corresponding maintenance personnel need to have access to the field devices in order to perform certain maintenance measures or reprogramming work or in which the terminals also have event-related data such as diagnoses or device information items, such as, for example, an electronic nameplate, in addition to continuously refreshed process values. However, if the field devices are built into the actual process in such a way that direct physical access is impossible, there is then only the possibility of setting up a communication via the automation network which is present in any case. In this case, however, the maintenance personnel is tied to the communication protocol on which the automation network is based, the maximum permissible packet sizes of said communication protocol often not making it possible, however, to consistently transmit the data elements to be interchanged with the field device, such as parameterization or diagnosis telegrams, for example.

PRIOR ART

DE 69825882 T2 discloses a system and a method for encapsulating ATM cells in an LAN frame. In this case, relatively large data packets are transformed to the so-called ATM (asynchronous transfer mode) standard, which is the standard for supporting fixed packet sizes with a length of 53 bytes. The relatively large data packets are in this case segmented into small data packets on the so-called network or transport layer.

US 2010/0166015 A1 describes a method for dynamic segmentation of data packets, wherein the segment size can be set depending on the connection quality and later also matched again. A similar method is also disclosed in EP 2 039

075 B1, wherein an already segmented packet can also be segmented further when a reduction in the maximum packet size has been identified.

DE 10 2009 013 229 A1 has disclosed a diagnosis method for fieldbus systems, in which diagnosis notifications can be prioritized such that the user can select, in a targeted manner, which group of diagnosis data are intended to be read.

Finally, DE 10 2008 025 234 A1 and 10 2006 055 513 A1 have disclosed a method, with which data can be transmitted, with priority, within a network, in particular a fieldbus network. For this purpose, that subscriber which, of all the subscribers, has the greatest interest in sending its data and therefore in claiming the medium for itself is determined in an arbitration phase. For this purpose, the individual subscribers set alternately determined bits in a message, wherein that terminal which has ultimately set the highest number of bits is treated with priority and can send its data.

PROBLEM

The problem of the present invention is to specify an improved method and automation system with which large data elements can be transmitted, despite a narrow-band communication protocol, to corresponding communication subscribers even in an automation network with cyclic data transmission and different data processing cycles.

SOLUTION

The problem is solved according to the invention by the features of the characterizing clause of claim 1. The problem is likewise solved according to the invention by the computer program according to claim 13, by an automation system according to claim 14 and by an automation network component according to claim 15.

Accordingly, the method according to the invention envisages that in each case by two network components, which may be, for example, terminals of a communication system and provide the possibility of full-duplex transmission of data elements, large data to be transmitted are divided into individual fragments by means of a fragmentation controller arranged on the first automation network component, it being possible for said individual fragments to be transmitted individually with the aid of the communication protocol on which the automation network is based by a single message. Thus, data elements passed on to the communication system at one of the terminals are transferred system-internally to the respective opposite terminal and are available again there in unchanged form.

In the case of cyclic data transmission via a plurality of interfaces between potentially deviating cycle times on transition from a quicker cycle time to a slower cycle time, the case may occur in which a fragment overwrites the previous fragment in the reception buffer before the slower interface on the opposite side is next ready to record data. In order to circumvent this problem and the associated data loss, it is proposed to transmit, together with each data fragment, a fragment information item which can be interpreted from the opposite side as data of the message. If further-processing of the fragment in the reception buffer is now performed by the second component, this is confirmed in the fragment information item and sent back to the first component. For this purpose, each sent fragment information item contains, in addition to the datum of the sent message, also a confirmation relating to a datum of a received message.

Since, however, it is generally not known to the transmitter when the actual data processing takes place on the opposite side, the present fragment is kept in the transmission buffer by means of a fragment message by the first automation network component and transmitted cyclically until a message received by the first component contains confirmation within the fragment information item for the present fragment. This makes it possible to ensure that the transmitter does not overwrite the preceding fragment on the opposite side by transmitting the next fragment.

The data transmission can therefore be kept synchronous and consistent even in the case of cyclic data transmission systems.

Further network components can also be arranged between the first automation network component and the second automation network component, said further network components serving to structure the entire automation system and passing on the messages corresponding to their specification.

Furthermore, such a method makes it possible for data elements of any desired size to be transmitted independently of the communication protocol of the automation network without it being necessary to take into consideration the communication protocol of the automation network and/or other subsections of the transmission path, such as that of the fieldbus, for example. In particular, greatest possible flexibility is thus achieved in heterogeneous network situations.

Advantageously, the second automation network component (opposite side) after the reception of all of the fragments is designed such that it can combine the received fragments again to form a complete data element by means of a defragmentation controller.

In order to keep the overhead as low as possible for the transmission of the fragments, merely in each case one single bit within the fragment information item is provided as the datum of an outgoing message and for the confirmation of a received message. In this case, the fragment information item is a bit sequence of information items with respect to the corresponding fragment. The bit sequence, often colloquially referred to as the header, is usually used as a prefix to the actual useful data, but can also be arranged at the end of the useful data. Within this fragment information item or the fragment header, a bit whose value acts as confirmation is now located at a specific point. The confirmation takes place, for example, by inversion of the bit.

In this case, the opposite side is advantageously designed such that it expects a corresponding status of a fragment identification. If it has processed a corresponding fragment with an expected fragment identification, the opposite side likewise inverts its fragment identification bit in order thus to be set to the next fragment identification bit to be expected. If the expected fragment identification bit does not correspond to the actually received fragment identification bit, the message is evaluated as a repetition of already known data and is ignored. Thus, the correct transmission and reception sequence of the individual fragments which is required for the ultimate fault-free assembly of all of the data on the opposite side can always be ensured.

It is particularly advantageous when the fragment information item contains corresponding information items both with respect to the outgoing data stream and with respect to the incoming data stream. Thus, it is possible, for example, for the reception of a fragment on the opposite side to be confirmed with the present message while this present message contains a new fragment and associated fragment information items.

One potential disadvantage with the need for confirmation of each message is that the transmitter can only generate a new message when the confirmation is there. It is therefore very particularly advantageous when each fragment has an associated transmission channel number and the fragments are then transmitted from the first automation network component to the second automation network component depending on the respective transmission channel number. The transmission channel number can be included in the fragment information item or in the fragment header, for example, and thus provides the possibility of differentiation on the opposite side.

It is thus conceivable, for example, in a particularly advantageous embodiment that a transmission channel number of a limited number of possible transmission channel numbers is assigned to each fragment. Fragments which have each been assigned the same transmission channel number are in this case sent sequentially, i.e. the next fragment with the same transmission channel number is only sent when the correspondingly correct reception of the preceding fragment with this transmission channel number has been correspondingly confirmed. However, fragments with different transmission channel numbers can be transmitted in parallel, i.e., for example, two fragments with different transmission channel numbers are written to the transmission medium successively without the reception of the first fragment by the opposite side having already been confirmed. Thus, despite the time delay owing to the processing of the opposite side, the fragments can be transmitted effectively using the entire channel bandwidth.

It is thus possible, in particular in the case in which the local cycle time deviates from the round-trip time of a message to the receiver to a significant extent, for particularly high utilization of the available resources to be achieved.

In order not to let safety-critical aspects of the automation system take a back seat even in the case of large amounts of data which are intended to be transmitted with the aid of a large number of fragments, it is very particularly advantageous when a prioritization or a priority is assigned to the data to be sent and the sequence of the transmission is selected depending on the assigned priorities. This makes it possible to transmit time-critical data, which may be present in the form of urgent diagnosis messages, for example, without delay to the opposite side.

In a particular embodiment of the prioritization, fragments of lower-priority data which are to be transmitted to the opposite side and are received from said opposite side are buffer-stored, with the result that data which are entered later but which have a higher priority from the first automation network component can be sent immediately to the opposite side and processed thereby as well. If all of the higher-priority data have been transmitted, the transmission can be continued with the still outstanding fragments, in terms of the buffer-stored data. It is thus conceivable, for example, for in each case corresponding priority channels to be assigned both to the transmitter and to the receiver, wherein the fragments are then assigned in the priority channels corresponding to their priority which they have obtained from the priority of their data. If the transmitter now establishes that there are new higher-priority data present in a priority channel, a corresponding short message is sent to the opposite side in order to switch over to the reception priority channel there, with the result that the higher-priority data now sent are also written to the correspondingly higher-priority reception channel. Fragments of lower-priority data which have already been sent in the other reception priority channels are in this case buffer-stored. Once all of the higher-priority fragments have been transmitted, it is possible to switch over back to the next-lower priority channel. For the data transmission of lower priorities, the switchover and temporary transmission in other priority channels is merely represented as a transmission gap; after changing back to the relevant priority, already successfully transmitted fragments do not need to be repeated, and nor does a data loss occur.

In this above-described first embodiment, it is thus possible that higher-priority data can be transmitted immediately to the opposite sides, to be precise independently of the transmission status of the respectively lower-priority data or fragments. On the other hand, the opposite side in this embodiment needs to be designed correspondingly in order that it can buffer-store the already sent fragments and can receive the higher-priority data. In order to be able to perform prioritization independently of the technical equipment state of the opposite side, in a second embodiment it is very particularly advantageous if higher-priority data are introduced further up in the transmission list, with the result that quicker processing can be ensured. However, if fragments of a data element have already been sent, first all of the fragments of this data element need to be transmitted before the higher-priority data can be transmitted. The advantage here, however, is that the priority intelligence is only necessary on the transmitter side. The receiver is not affected in this case.

Furthermore, it is very particularly advantageous also if, prior to or during the data transmission, the receiver functionality on which the receiver is based is determined and verified. In particular when the technical equipment state of the communicating network components differs from one another, this makes it possible to establish a transmission channel which is matched to the technical equipment state of the weaker component and which nevertheless realizes as efficient utilization as possible of the communication protocol used as the basis as regards the transmission parameters such as, for example, the fragment size, the number of transmission channels and the number of priorities.

Moreover, it is also very particularly advantageous if the fragmentation controller and/or defragmentation controller each represents part of a control program running on the respective automation network component for controlling the automation process. By virtue of the arrangement of the fragment controller in the application plane, the fragmentation and/or defragmentation controller is completely independent of interposed communication protocols such as, for example, the internal system bus of the I/O system or the fieldbus between the fieldbus coupler and the fieldbus master. It is therefore possible for any desired data amounts or data sizes to be transmitted over any desired automation network, since a change to the communication protocol is not necessary for this purpose.

Moreover, the problem is also solved by a computer program with program code means which are stored in particular on a machine-readable storage medium, designed for implementing the above method, when the computer program is run on a computer.

Furthermore, the problem is also solved by an automation system, designed for implementing the above method, comprising a first automation network component and at least one second automation network component, which are formed via an automation network for cyclic data transmission using a communication protocol on which the automation network is based for the purpose of data transport and are connected to one another. Moreover, the problem is also solved by an automation network component with a fragmentation controller and/or defragmentation controller.

The invention will be explained in more detail by way of example with reference to the attached drawings, in which:

FIGS. 4a, 4b, 4c show a depiction of message priorities.

Figure 1:
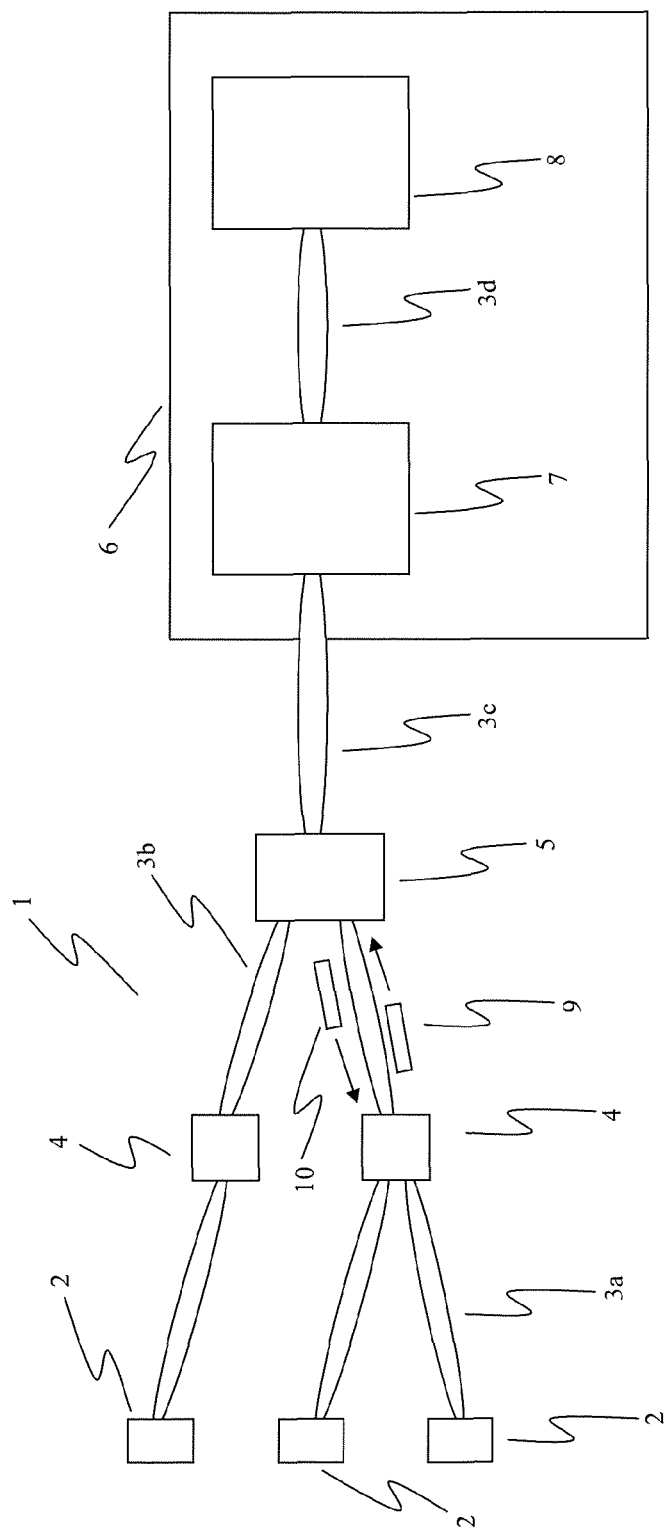
FIG. 1 shows a schematic illustration of an automation system with a plurality of planes.

FIG. 1 shows a schematic illustration of an automation system 1 with a plurality of planes. The automation system 1 in this case comprises field devices 2, which may be sensors or actuators, for example. The field devices 2 are connected to in each case one I/O module 4 via an automation network 3a. The I/O module 4 is furthermore connected to the fieldbus coupler 5 via a further automation network 3b. Said fieldbus coupler is a subscriber to a further automation network 3c, in which a component of a superordinate controller 6 is active as fieldbus master 7, said controller implementing the control and regulation of the process to be automated within the framework of a cyclically processed program 8.

The automation network 3b is in this case provided for cyclic data transmission, which can also apply to automation networks 3a and 3c. This means that the I/O modules 4, corresponding to the cyclic processing time established by the fieldbus coupler 5, interchange messages 9 and 10 with said fieldbus coupler. In this case, the messages can contain so-called process images, which, in each case at the transmission time of the message 9, contain the corresponding status of the respective field device 2, such as sensor data or actuator positions, for example. This process image which is contained in the message 9 is written to the reception buffer on the opposite side 5, while the message 10 is then sent back to the I/O module 4 again via the return channel.

The message 10 which is sent back can contain, for example, process output images which are suitable for driving the field devices correspondingly. If fieldbus coupler 5 and the fieldbus masters 7 and automation program 8 have the same cyclic processing time, the data are also processed correspondingly by 7 and 8 in the same sequence used for writing them to the reception buffer of 5.

If, however, the cyclic processing times differ, for example, in such a way that the I/O system (comprising 4, 5) exchanges messages internally every 2 milliseconds, while the interchange cycle predetermined by the bus master 7 in the automation network 3c is 4 milliseconds, for example, two messages are recorded in the reception buffer of 5 before one message is recorded in the reception buffer of 7. Conversely, it is also true that each message which is conducted from 8 via 7 to 5 is sent there twice to 4 before a new message can be present.

Figure 2:
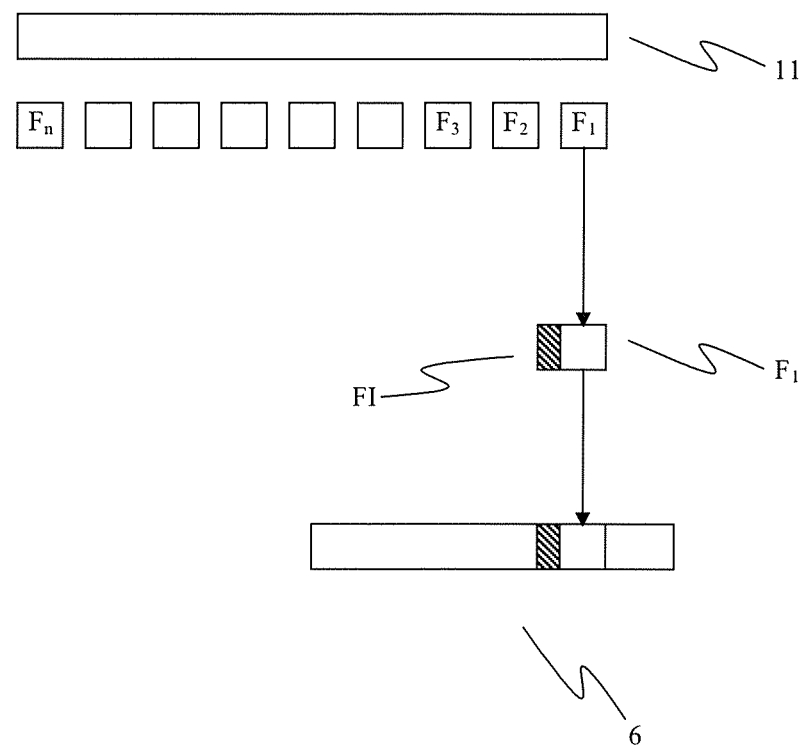
FIG. 2 shows a schematic illustration of fragmentation of a data element.

If data which have been fragmented successively in the I/O module 4, as is illustrated in FIG. 2, for example, were to be generated with the cyclic processing time of the fieldbus coupler 5, every second message which contains the second fragment would overwrite the first fragment written to the reception buffer with the first message without the opposite side 7 realizing this since the cyclic processing time of the opposite side 7 is greater than that of 5. Without the use of any flow control, fragments would simply be missing in this case.

FIG. 2 shows a data element 11 which is intended to be transmitted by means of a message 9 known from FIG. 1 from I/O module 4 by means of a plurality of automation networks to the control program 8. However, the data element 11 is so large that it cannot be transmitted with the aid of a normal data message of the communication protocol in one or more of the automation networks 3b, 3c. Therefore, the data element 11 is split into a multiplicity of fragments $F_1$ to $F_n$. Each of these individual data fragments $F_1$ to $F_n$ has in this case such a size that it can be transmitted with the aid of a data message 9, 10 of the communication protocol of the automation network 3.

Therefore, the individual data fragments $F_1$ to $F_n$ are sent successively, wherein a fragment information item FI is added to each data fragment $F_1$ to $F_n$ as a prefix, said fragment information items already containing corresponding information items for the purpose of a verified and therefore loss-free fragment transmission, including a confirmation region with which the opposite side can correspondingly confirm the reception of the fragment and the further-processing.

The fragment $F_1$ with the prefix header FI is now passed on to the network layer of the communication protocol, with the result that the fragment $F_1$ together with the fragment information item FI is integrated as useful data in the network message 9. Depending on the communication protocol, the message or the transmission window 9 has corresponding control messages, as are generally used in communication protocols.

Owing to the integration of status and control messages in the data region of a message with the aid of the fragment information item FI (header), therefore, instead of a reception confirmation of the message itself, which normally takes place on the protocol plane, the confirmation of the fragment in the message is reached by the opposite side 8, with the result that large data elements can be transmitted reliably by means of individual fragments even in the case of cyclic data transmission or data processing.

Figure 3:
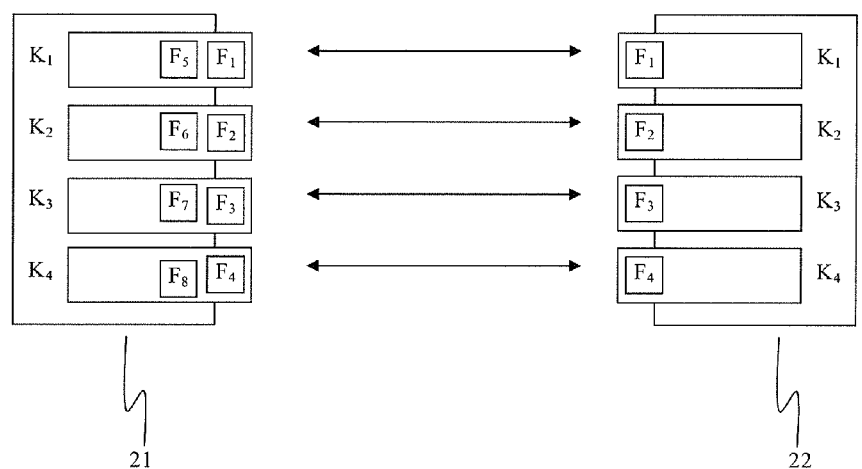
FIG. 3 shows a schematic illustration of channel multiplexing.

FIG. 3 shows a schematic of channel multiplexing with four channels. For this purpose, the transmission buffer 21 of the first component 2 has four logic channels, in which fragments to be sent can be sorted. The opposite side 4 has moreover a reception buffer 22, which likewise has corresponding logic reception channels. In the example in FIG. 3, the fragments $F_1$ to $F_n$ are divided between the individual channels K1 to K4, with the result that the fragments $F_1$, $F_5$, $F_9$, etc. are in channel K1, the fragments $F_2$, $F_6$, $F_{10}$, etc. are in channel K2, the fragments $F_3$, $F_7$, $F_{11}$, etc. are in channel K3, and the fragments $F_4$, $F_8$, $F_{12}$, etc. are in channel K4.

Each transmission channel per se uses the confirmation functionality of the sequential operating mode, i.e. a further fragment of the respective channel is only sent when the previously sent fragment has been confirmed by the opposite side. In the exemplary embodiment, this means that the fragment $F_5$ of channel K1 is only sent when the fragment $F_1$ has been confirmed by the opposite side. In the meantime, the other fragments in the other channels can of course be transmitted.

This will be explained briefly with reference to a specific exemplary embodiment. At the beginning, the fragment $F_1$ in channel K1 is transmitted. Irrespective of whether this fragment has been confirmed or not in the next cyclic processing, the fragment $F_2$ in the channel K2 is transmitted. This is followed by fragment $F_3$ in channel K3 and fragment $F_4$ in channel K4. Then, the sequence with channel 1 is started again, i.e. fragment $F_1$ is sent again when there is not yet any confirmation of this. If in the meantime a corresponding confirmation should be received at the transmission unit, however, the correspondingly next fragment of the channel to which the confirmed fragment belongs is transmitted. On the opposite side, the individual fragments are sorted into the corresponding transmission channels of the reception buffer 22. It is conceivable in this case for the transmission channel number to be in the header information item of the fragment information item FI. It is also conceivable for the transmitter and the receiver to arrange in advance how many multiplex channels or transmission channels $K_1$ to $K_n$ they would like to use in order to match the transmission to the properties of the transmission path formed from the interconnection of a plurality of automation networks.

With the aid of the transmission channels, it is thus possible to achieve a situation in which it is not necessary to wait for confirmation for each fragment, but it is already possible for further fragments to be sent within the cyclic processing time on the opposite side without the previously sent fragments needing to be confirmed. It is thus possible to achieve a high data throughput even in the case of a narrow bandwidth and a high degree of discrepancy between the cyclic processing times.

FIGS. 4a, 4b and 4c each show different models of the combination of the two prioritization methods, namely firstly the buffer-storing of already sent fragments and secondly the transmitter-side resorting of the transmission list.

FIG. 4a shows the first model, in which an attempt is first made to use the prioritization by means of buffer-storing on the opposite side, since this forms the greatest delineation. Only when this procedure has been exhausted is the method of resorting the transmission lists used for messages with the highest priority until this procedure has also been exhausted. Messages with an even higher priority are handled over the maximum priority within the transmitter.

The maximum priority in this case results from:

maximum priority=min(number of fragmenters;number of defragmenters)+number of local subpriorities.

The subpriorities in this case reflect those priorities with which the transmission list can be resorted. The number of fragmenters is in this case the number of those priorities with which buffer-storing can be implemented.

In this case, FIG. 4a shows an example of a transmitter with two fragmenters and five subpriorities and a receiver with three fragmenters. In this example, a defragmenter lies idle on the receiver side since the transmitter has fewer fragmenters than the receiver has defragmenters.

During the prioritization, the fragments are classified, depending on priority, into the fragmenter which is associated with the corresponding priority. Only when the priority exceeds the number of possible fragmenters are the data sorted into the fragmenter with the highest possible priority and is then the transmission list correspondingly resorted there.

On the opposite side, there is a corresponding receiver counterpart, i.e. corresponding defragmenters are associated with different priorities there, too.

The priority which is used at a particular time is established in advance between the transmitter and the receiver by means of a message. If the transmission buffer of a fragmenter with a high priority has been emptied, the transmission buffer with the next higher priority is used for the further processing, with the priority needing to be switched over on the receiver side as well in advance.

FIG. 4b shows a table, in which first the subprioritization is intended to be fully exhausted before new prioritization with buffer-storing is used. This provides the possibility of markedly finer imaging of the callup priority, but the graduations are not uniform here, since the change to the next priority has greater effects than the change to the next subpriority.

In this case, FIG. 4b shows an example of a transmitter with four fragmenters and two subpriorities and a receiver with three fragmenters.

The highest channel-supported priority in this model corresponds to the following:

maximum priority=min((min(number of fragmenters; number of defragmenters)*number of local subpriorities);255)

In this example, a fragmenter lies idle on the transmitter side since the receiver has fewer defragmenters than the transmitter has fragmenters.

FIG. 4c shows a table in which subprioritization is used exclusively for the lowest priority supported jointly by transmitter and receiver. This has the advantage that there is particularly clearly delineation, specifically for the higher priorities with more important data, while there nevertheless remains the possibility of finer differentiation for lower-priority data owing to subprioritization.

The highest channel-supported priority in this model corresponds to that in model 4a.

The invention claimed is:

1. A method for transmitting data in an automation system for controlling machines and installations, the automation system comprising a first automation network component and at least a second automation network component, said automation network components being formed via at least one automation network for cyclic data transmission using a communication protocol on which the respective automation network is based for the purpose of data transport and being connected to one another, the method comprising:
   using a fragmentation controller to divide that data to be transmitted into a plurality of fragments;
   sending the fragments with a fragment information item using in each case one fragment message via the respective communication protocol from the first automation network component to the second automation network component;
   confirming by the second automation network component the reception of a fragment contained in the respective fragment message in the fragment information item of the fragment message, wherein a fragment is transmitted cyclically using a fragment message from the first automation network component until a fragment message with a reception confirmation contained in the fragment information item is received by the first automation network component; and
   assigning priority channels to both the first automation network component and the second automation network component, wherein the fragments are assigned in the priority channels corresponding to their priority which they have obtained from the priority of their data.

2. The method according to claim 1, further comprising once all of the fragments of a data element have been received by the second automation network component, using a defragmentation controller to combine again the data to be transmitted.

3. The method according to claim 1, wherein confirming the reception of the fragment includes confirming the reception of a fragment by inversion of a confirmation bit contained in the fragment information item.

4. The method according to claim 1, further comprising, after each confirmed reception of a fragment, prior to the subsequent fragment being sent, inverting a fragment identification bit and sending to the second automation network component the inverted fragmentation identification bit in the fragment information item.

5. The method according to claim 1, wherein the fragment information item of a message contains information items regarding the fragment contained in the message and information items regarding a fragment received previously by the transmitter.

6. The method according to claim 1, wherein the fragmentation controller and/or defragmentation controller are each part of a control program running on the respective automation network component for controlling the automation process.

7. The method according to claim 1 further comprising assigning a transmission channel number each fragment, and sending the fragments from the first automation network component to the second automation network component depending on the respective transmission channel number.

8. The method according to claim 7, further comprising sending the fragments depending on their respective transmission channel number such that fragments with the same transmission channel number are sent sequentially by the first automation network component only when the reception confirmation of the fragment message of the preceding fragment with the transmission channel number has been received.

9. The method according to claim 1 further comprising assigning the data to be transmitted a priority, with a sequence for the transmission of the data taking place depending on the priorities assigned to the data.

10. The method according to claim 9, further comprising, prior to sending higher-priority data, the first automation network component storing in a buffer fragments of lower-priority data which are still to be sent and storing in the buffer already received fragments of lower-priority data until all of the fragments of the higher-priority data have been received by the second automation network component.

11. The method according to claim 9, further comprising inserting fragments of data to be sent in a fragment transmission list of the first automation network component depending on the priority of the data to be sent.

12. The method according to claim 1, further comprising determining by the first automation network component a receiver functionality of the second automation network component, and matching transmission parameters depending on the receiver functionality.

13. A non-transitory computer readable medium comprising computer executable instructions adapted to perform the method according to claim 1.

14. An automation system, configured for implementing the method according to claim 1, comprising a first automation network component and at least one second automation network component, said automation network components being formed via an automation network for cyclic data transmission using a communication protocol on which the automation network is based for the purpose of data transport and for being connected to one another.

15. An automation network component, configured for implementing the method according to claim 1, with a fragmentation controller, which is configured for splitting data to be transmitted into a plurality of fragments, wherein the automation network component is configured to send the fragments together with a fragment information item using in each case one fragment message using a communication protocol of an automation network which can be connected to the automation network component in such a way that a fragment message is transmitted cyclically by the automation network component until a fragment message with a reception confirmation contained in the fragment information item is received.

16. The automation network component according to claim 15, wherein in that the automation network component has a defragmentation controller, which is configured to combine the data to be transmitted once all the fragments have been received.

\* \* \* \* \*